(12) United States Patent
Parker (10) Patent No.: US 6,212,932 B1
(45) Date of Patent: Apr. 10, 2001

(54) PNEUMATIC SHEAR FOR FORMING STRUCTURAL LOUVERS

(76) Inventor: James R. Parker, 515 E. Carefree Hwy #103, Phoenix, AZ (US) 85085

( * ) Notice: Subject to any disclaimer, the term of this patent is extended or adjusted under 35 U.S.C. 154(b) by 0 days.

(21) Appl. No.: 09/356,540

(22) Filed: Jul. 19, 1999

(51) Int. Cl.[7] .................................. B21J 9/18; B21D 7/00
(52) U.S. Cl. ..................... 72/409.12; 72/451; 72/453.15; 72/325
(58) Field of Search ............................... 72/409.12, 451, 72/453.15, 453.16, 450, 407, 325, 326

(56) References Cited

U.S. PATENT DOCUMENTS

| | | |
|---|---|---|
| 1,743,209 | 1/1930 | Groehn . |
| 2,874,666 * | 2/1959 | Thor ...................................... 72/325 |
| 3,714,688 * | 2/1973 | Olson .................................... 72/325 |
| 3,877,280 | 4/1975 | Cornell . |
| 4,353,240 | 10/1982 | Undin et al. . |
| 4,531,397 | 7/1985 | Pratt . |
| 4,558,584 | 12/1985 | Myers . |
| 4,893,493 | 1/1990 | Jacques et al. . |
| 4,989,438 | 2/1991 | Simon . |
| 5,381,686 | 1/1995 | Thorup . |
| 5,509,291 | 4/1996 | Nilsson . |
| 5,878,617 | 3/1999 | Parker . |

FOREIGN PATENT DOCUMENTS 2423226   11/1975   (DE) .................................. 72/453.16

* cited by examiner

Primary Examiner—David B. Jones
(74) Attorney, Agent, or Firm—John D. Titus (57) ABSTRACT

A power assisted combination shear used for forming structural louvers in the crimped seam of structural steel decking comprises a frame supporting a pair of jaws which are opened and closed by means of an operator-controlled pneumatic cylinder. One jaw terminates in a blade, the other jaw has a corresponding die member. The blade and die have undercut reliefs in the root portions, which permit the louver to be formed without breaking through to the edge of the seam. The louver comprises a sheared portion in the form of a bowed tab bridging a corresponding window formed in the seam by the shearing of the tab. The interference between the louver and window provides a substantial increase in the lateral resistance (shear strength) of the crimped seam, thereby obviating the need to additionally weld or screw the seam to provide the necessary shear strength for even the highest stress applications.

9 Claims, 6 Drawing Sheets

PNEUMATIC SHEAR FOR FORMING STRUCTURAL LOUVERS

BACKGROUND OF THE INVENTION

Figure 1:
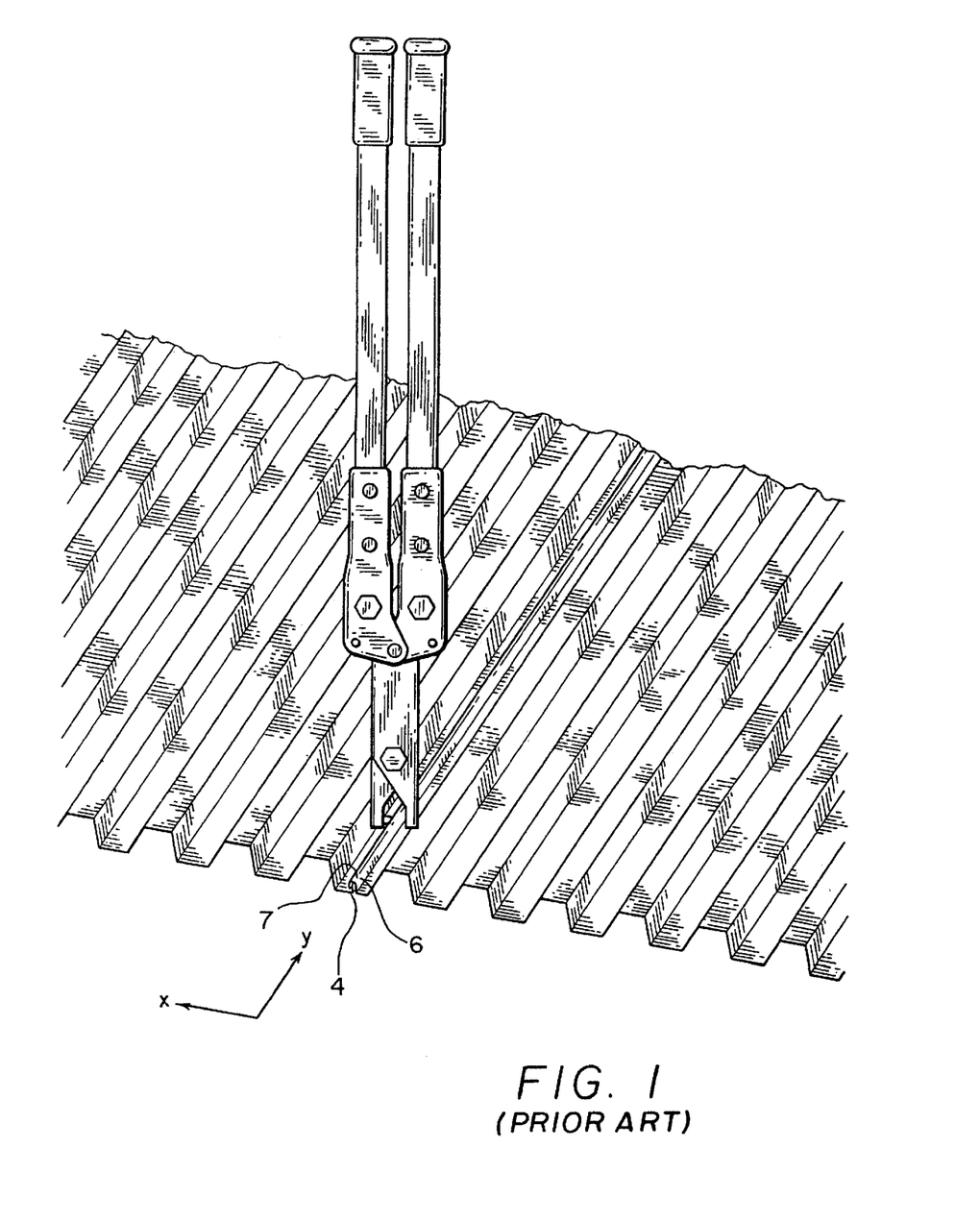
FIG. 1 is a prior art crimping tool for use with steel decking and roofing.

The present invention relates to tools for forming features in the joints of structural steel decking and roofing commonly used in large commercial construction, for example, as subflooring for poured concrete floors or as roofing for large industrial buildings. Structural steel decking is typically manufactured in thicknesses ranging from 22 gauge to 16 gauge or more. The decking generally is supplied to the building site in panels ranging in size from 3 feet by 15 feet to about 3 feet by 35 feet. Longitudinal ribs, typically hat sections or flat-bottomed vee sections of from 1½ to 3 inches in depth are formed in the panels to increase the section modulus of the panels. The individual panels are typically provided with one edge having an exposed upward "male" lip. The opposite edge is provided with a female inverted "U" shaped lip. The individual panels are joined together by placing the female lip over the male lip and crimping the seam at periodic intervals. In many applications, the joints must secure the panels together so as not only to prevent one panel from lifting off the other, but also to prevent the panels from shifting laterally along the seam (along the y-axis as shown in FIG. 1). By holding the panels securely enough to prevent lateral shifting, the assembled decking adds considerable membrane strength to the finished building. Given the inherent weakness of crimped joints to lateral shifting, typically where high membrane strength is required, welding or screwing of the seam is necessary to meet the specified shear strength.

A prior art method for crimping steel decking comprises use of a hand-operated tool shown in FIG. 1, known as the 601 SEAM LOCKER, distributed by Miramar Specialties of Ventura, Calif. The prior art apparatus comprises a compound-lever press in which the operator moves the handles apart to provide the force to crimp the panels together. An optional button punch is provided to upset a portion of the seam to provide some lateral stiffness. Since the apparatus comprises merely a compound lever arrangement, however, it provides a linear multiplication of the force exerted by the operator on the handles. As can be appreciated from the foregoing, hand crimping of thousands of seams is a laborious task and, given the inevitability of operator fatigue, an inherently unreliable method for providing seams having the uniformity necessary to achieve a high degree of lateral stiffness.

Various portable power tools have been developed for setting rivets, crimping sheet metal trusses, and for other applications. For example, U.S. Pat. No. 1,743,209 to Groehn discloses a fastener setting device comprising a toggle-actuated jaw and anvil adapted for setting rivets, particularly in the construction of automobile bodies. U.S. Pat. No. 3,877,280 to Cornell discloses a hand operated power assisted punch and die for crimping sheet metal studs and joists together to form a modular wall panel. U.S. Pat. No. 4,989,438 to Simon discloses a hand-operated power assisted punch and crimp for attaching comer bead to exterior comers in sheet rock or gypsum board walls.

Applicant's prior application Ser. No. 961,162, now U.S. Pat. No. 5,878,617 (incorporated herein by reference) disclosed a pneumatically operated decking crimper having multiple button punches arranged in a staggered configuration. The alternating offset upset portions of the flange formed by the multiple button punches substantially increased the lateral resistance of the crimped seam. However, the inclined walls of the upset portions will tend to pry the seam apart if sufficient side loading is applied. Accordingly, the lateral resistance of the seam thus formed may not be sufficient for some extremely high stress applications. Accordingly, what is needed is an apparatus for producing a crimped joint that has lateral resistance approaching the sheer strength of the roofing panel itself

SUMMARY OF THE INVENTION

The present invention provides a power assisted combination shear and punch particularly suited to shearing and offsetting a portion of the crimped lip of structural steel decking and roofing panels thereby forming a structural louver in the seam. In a preferred embodiment, the invention comprises a frame supporting a pair of jaws which are opened and closed by means of a toggle linkage that is driven by an operator-controlled pneumatic cylinder. The input pivot of the toggle linkage is constrained to move linearly by means of a cross head formed in the frame which, in turn, causes the jaws to move in unison rather than one jaw moving against the other. One jaw terminates in a blade having an undercut relief in the root portion thereof, such that as the decking or roofing panel joint is sheared by the jaws, the undercut portion prevents the sheared section from breaking through to the edge of the seam. The other jaw has a corresponding die member which supports the seam as the sheared portion is sheared from the seam. The sheared portion forms a bowed tab or louver bridging the corresponding window formed in the seam. The interference between the louver and window provides a substantial increase in the lateral resistance (shear strength) of the crimped seam, thereby obviating the need to additionally weld or screw the seam to provide the necessary shear strength for even the highest stress applications.

BRIEF DESCRIPTION OF THE DRAWING

The present invention will be better understood from a reading of the following detailed description, taken in conjunction with the accompanying drawing figures in which like references designate like elements and in which.

DETAILED DESCRIPTION

The drawing figures are intended to illustrate the general manner of construction and are not necessarily to scale. In the description and in the claims, the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

The present invention relates to tools for forming features in the crimped joints of structural steel decking and roofing commonly used in large commercial construction, for example, decking used as subflooring for poured concrete floors or as roofing for large industrial buildings. As shown in FIG. 1, the individual decking or roofing panels are typically provided with one edge having an exposed upward "male" lip 4. The opposite edge is provided with an inverted "U" shaped female lip 6. The individual panels are typically joined together to form a seam 7 by placing the female lip 6 over the male lip 4 and crimping the seam at periodic intervals. A prior art method of crimping the seam comprises use of a crimping tool known as the 601 SEAM LOCKER in which the user positions the jaws of the tool over the joint and, by pulling the handles of the tool apart, exerts a crimping force on the seam. The jaws of the crimping tool close the seam 7 while the upset portion formed by the punch and die form an upset that adds some lateral resistance to the seam 7.

Figure 2:
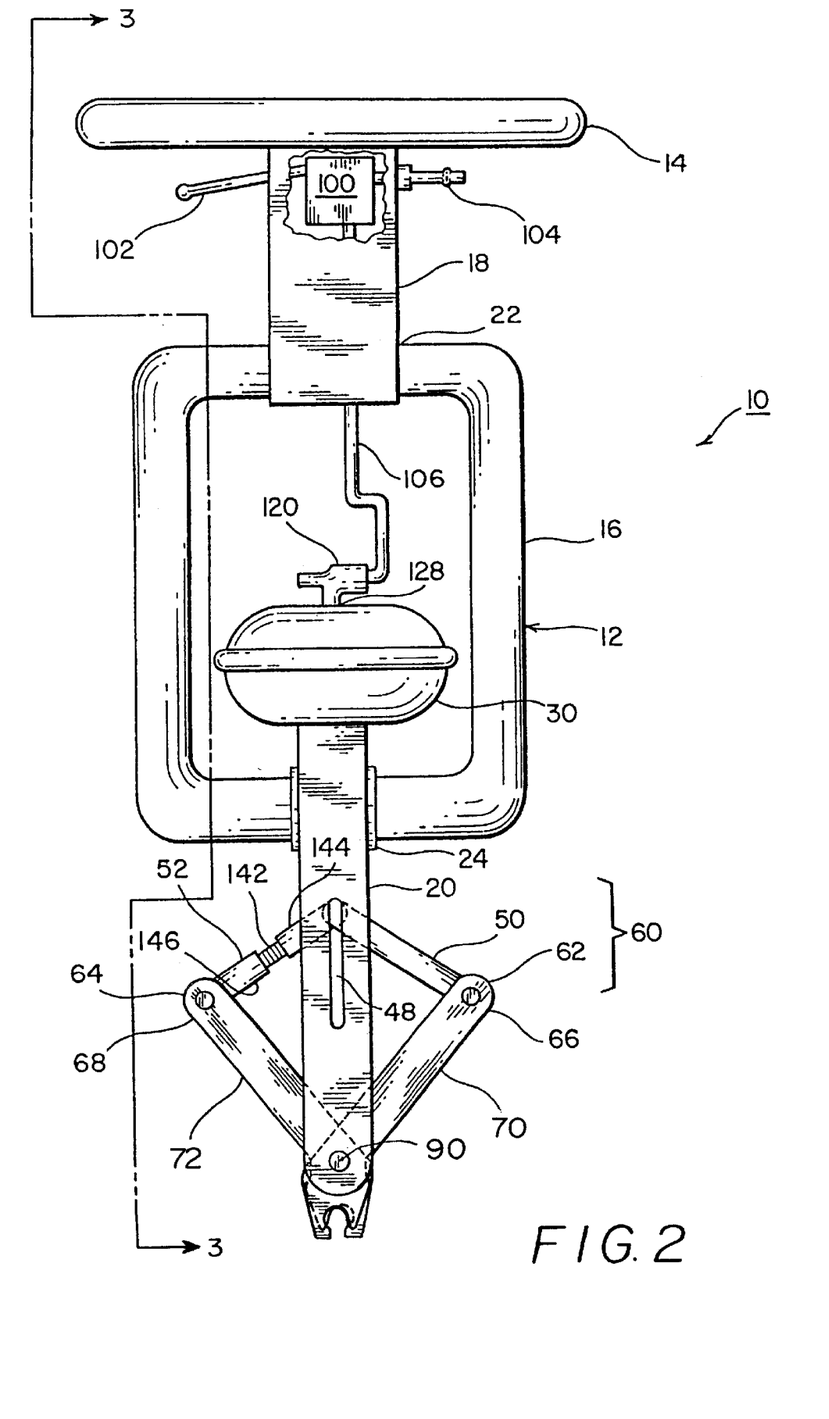
FIG. 2 is a side plan view of an illustrative pneumatic shear apparatus incorporating features of the present invention.
Figures 3, 4:
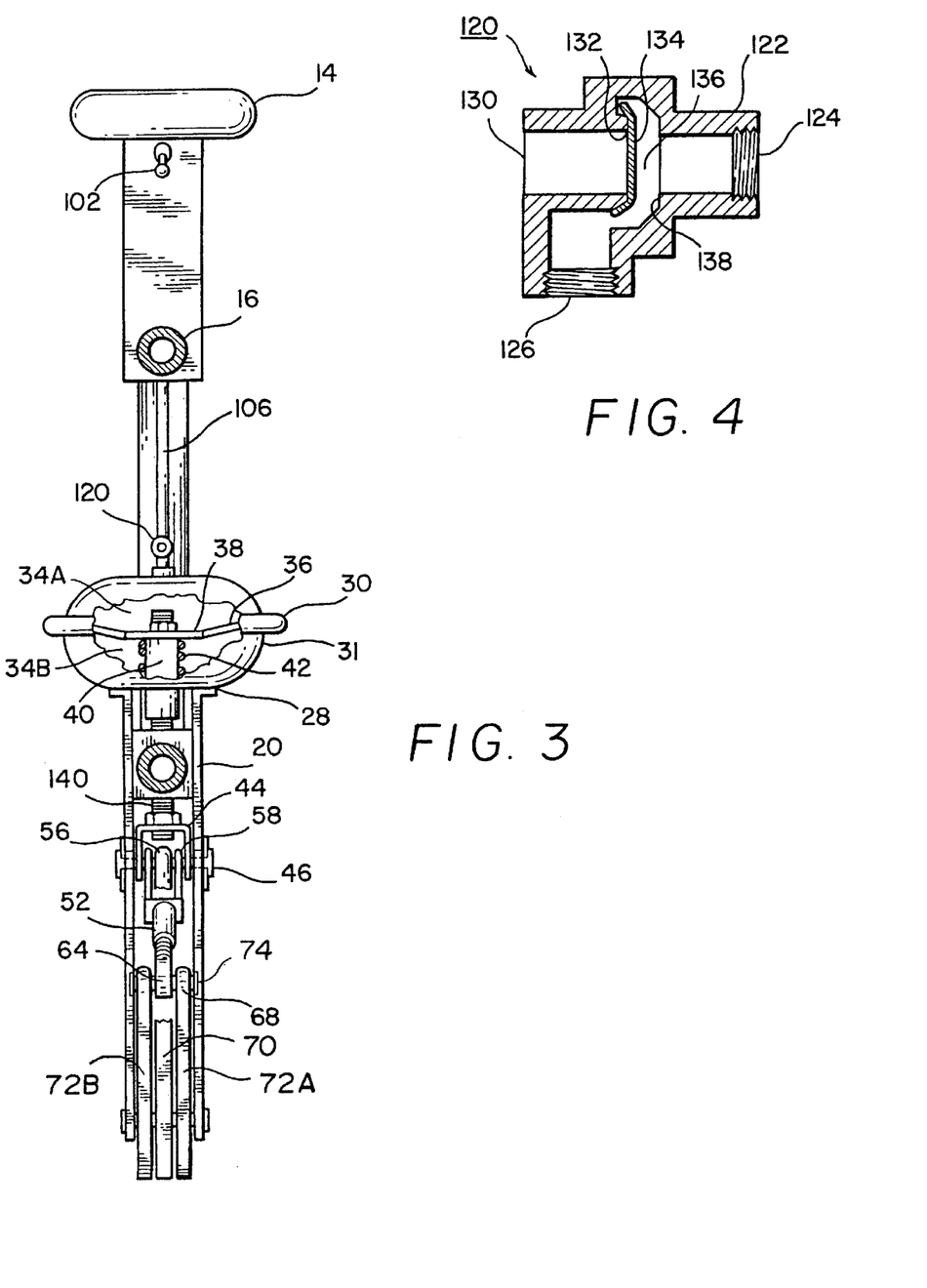
FIG. 3 is a partial cross section view of the apparatus of FIG. 2 taken along line 3—3.
FIG. 4 is a cross section view of a bi-directional valve in accordance with the present invention.

Referring to FIGS. 2 and 3, an illustrative embodiment of the present invention comprises a tool 10 comprising a frame 12 having a handle 14 adapted to be grasped by a user at about waist level so that the lower extreme of tool 10 is at about foot level. The central section 16 of frame 12 comprises a rectangular frame constructed of hollow tubing which supports an upper extension 18 and a lower extension 20. Upper extension 18 is constructed of a single piece of rectangular tubing welded to the upper surface 22 of central section 16 or, alternatively, upper extension 18 may be constructed of individual plates welded together to form a rectangular tube. Lower extension 20 is formed of two parallel plates welded to spacer 24 which, in turn, is welded to central section 16.

Referring to FIG. 2, a pneumatic cylinder 30 is attached to the upper edge 28 of lower extension 20. Pneumatic cylinder 30 may comprise a piston inside a bore or other conventional pneumatically actuated linear motor. Preferably, pneumatic cylinder 30 comprises a housing 32 which is divided into upper and lower chambers 34A and 34B by a diaphragm 36, which is crimped or otherwise sealed along the periphery of housing 32. The center portion of diaphragm 36 is covered by a piston plate 38, which acts as a rigid surface for the pressure in chamber 34A to act upon. In the illustrative embodiment, pneumatic cylinder 30 exerts a force of 4,320 pounds at an inlet pressure of 100 psi with a maximum stroke of 2¾ inches, which corresponds to jaw movement of about 11/16 inch for jaws having a 2¾ inch blade. Thus, when used in combination with the toggle linkage as described herein, the pneumatic cylinder 30 provides the force and displacement necessary to shear and then offset a louver (as described hereinafter) in virtually all standard structural steel decking in a single-pass operation.

Ram 40 is attached to piston plate 38 in order to convert the pressure action on piston plate 38 and diaphragm 36 into a force for actuating the jaw mechanism as hereinafter described. A return spring 42 acts against the pressure in chamber 34A to return the piston plate 38 to the upper limit of travel when pressure in chamber 34A is equal to the pressure in chamber 34B.

The lower end of ram 40 terminates in a clevis 44 through which passes a clevis pin 46. In addition to passing through clevis 44, clevis pin 46 passes through the upper ends 56, 58 of the input links 50 and 52 of a toggle linkage 60. The lower ends 62 and 64 of input links 50 and 52 are pivotally attached to the upper ends 66 and 68 of jaws 70 and 72. Jaws 70 and 72 are pivotally attached to the lower end of lower extension 20 of frame 12 to open and close in response to the movement of toggle linkage 60. As shown in FIG. 3, jaw 70 comprises a single blade while jaw 72 comprises a pair of blades 72A and 72B constrained by link pin 74 to move in unison. A cross-head slot 48 is provided in lower extension 20. Cross head slot 48 engages clevis pin 46 to constrain clevis pin 46, which comprises the toggle input, to move linearly and, therefore, constrains the jaws 70 and 72 to move in equal and opposite directions.

A conventional air valve 100 housed within upper extension 18 regulates a source of pressurized air admitted through fitting 104 and provides a pressurized output into hose 106 for admittance into pneumatic cylinder 30. An external valve handle 102 is provided for controlling air valve 100 by the operator. Preferably, a bidirectional valve 120 is operatively disposed between air valve 100 and pneumatic cylinder 30 to admit pressurized air into pneumatic cylinder 30 when air valve 100 is open and to exhaust air from pneumatic cylinder 30 when air valve 100 is closed, thereby allowing pneumatic cylinder 30 to return to its upper limit of travel more rapidly, and thereby increasing the cycle rate of the apparatus.

As shown more fully in FIG. 4, a bidirectional valve 120 comprises a housing 122 having an inlet 124 which is threaded to receive a standard hose or tube fitting, an outlet 126 which is threaded to form an airtight seal with the inlet 128 (FIG. 2) of pneumatic cylinder 30. Housing 122 further comprises an exhaust port 130. Valve seat 132 is formed on the inner surface of exhaust port 130. A flexible valve member 134 is constrained within chamber 136 of housing 122. As can be seen from FIG. 4, as high pressure air from air valve 100 enters through inlet 124, valve member 134 is forced against valve seat 132 to close off exhaust port 130 and direct the flow of air through outlet 126 into pneumatic cylinder 30. Once air valve 100 is closed, air from pneumatic cylinder 30 begins to reverse direction and enter housing 122 through outlet 126. The reversed flow of air through outlet 126 causes valve member 134 to seat against surface 138, thereby opening exhaust portion 130 to permit relatively unobstructed exhaust of pressurized air from pneumatic cylinder 30.

Figure 5:
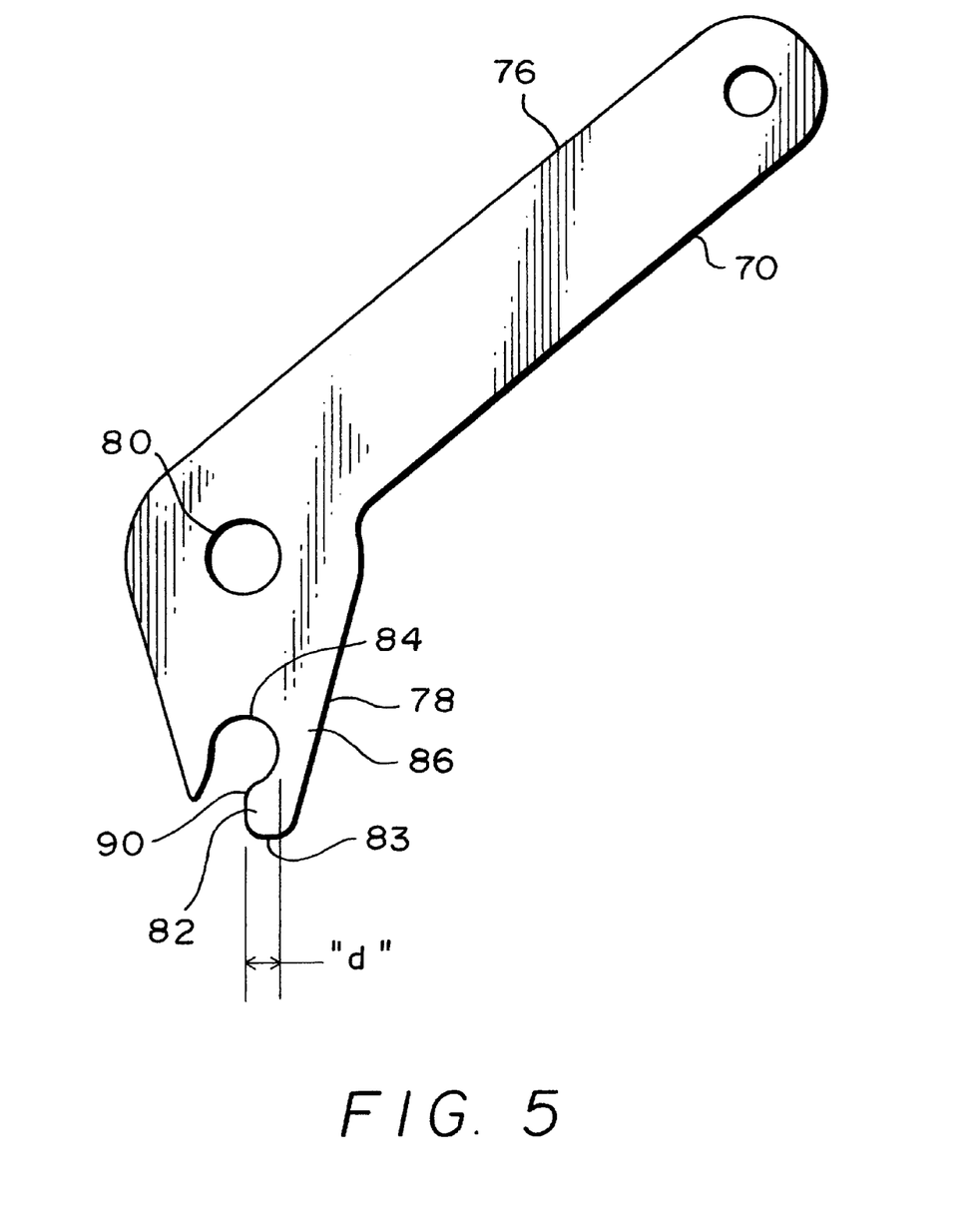
FIG. 5 is a side elevation view of a jaw used in the illustrative pneumatic shear.

FIG. 5 is a side elevation view of jaw 70 of the apparatus of FIG. 2. In the embodiment of FIG. 5, each of jaws 72A and 72B are mirror images of jaw 70 and therefore will not be discussed in detail. Jaw 70 comprises input arm 76, output arm 78 and bearing journal 80 about which jaw 70 pivots under the urging of pneumatic cylinder 30. Output arm 78 comprises a blade portion 82 having a rounded tip 83 and an undercut region 84 in the region of the root 86 of blade 82. Preferably, the depth dimension "d," of undercut region 84 at a minimum is equal to the stroke of blade 82 as urged by pneumatic cylinder 30 plus one-half the thickness of flange 7 such that the upper end of flange 7 is not sheared by blade 82. The maximum depth "d" may be as large as desired to provide additional clearance, however, the undercut region 84 should not be so large as to reduce the strength of blade 82 below that necessary to effect the shearing action of flange 7 as described hereinafter.

Figure 6:
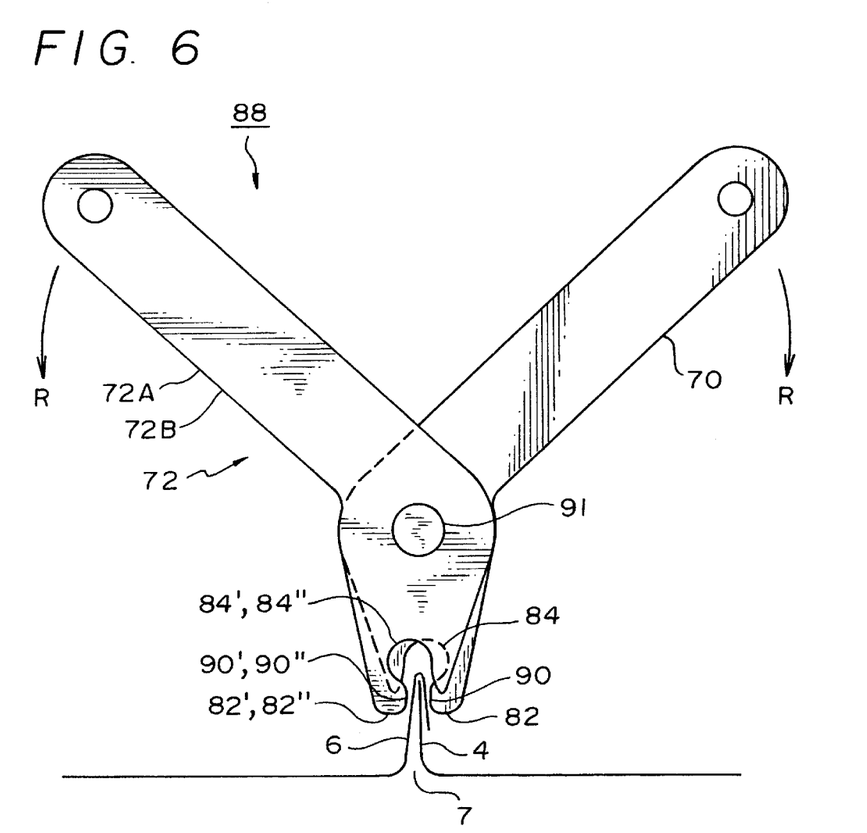
FIG. 6 is a side elevation view of the jaw assembly of the illustrative pneumatic shear.
Figure 7:
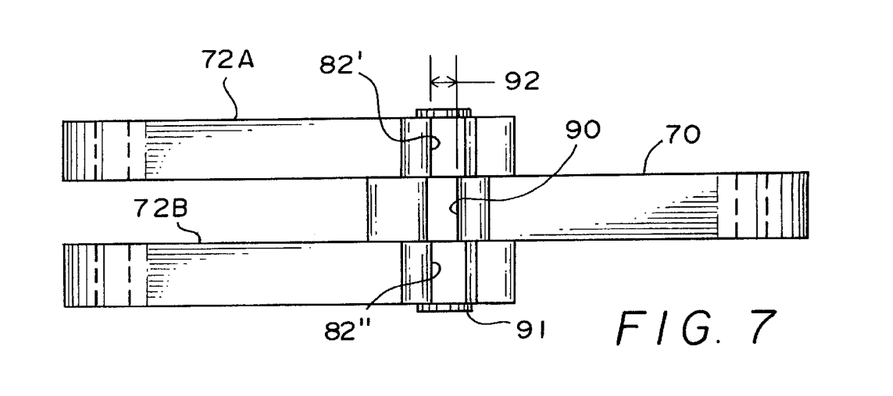
FIG. 7 is an end view of the jaw assembly of FIG. 7.

As shown in FIGS. 6 and 7, jaw subasssembly 88 comprises jaw 70 and jaw assembly 72 comprising jaw 72A and jaw 72B all pivoted about a common shaft 91. As shown in FIG. 6, jaw 70 is displaced into the page from jaw 72A and jaw 72B is further displaced into the page from jaw 70. Jaw 72B is not visible in FIG. 6 because it is identical to and directly behind jaw 72A. In the open position as depicted in FIG. 6, blade 82 is displaced from blades 82' and 82" of jaw 72A and jaw 72B, respectively, such that a flange 7 consisting of male lip 4 and female lip 6 can be inserted into the gap 92 defined between surface 90 of blade 82 and surface 90', 90" of blades 82', 82".

With reference in particular to FIGS. 2, 3, 6 and 8, in operation of the tool 10 in accordance with the present invention, a user positions jaws 70 and 72 over flange 7 and depresses the valve lever. High pressure air entering pneumatic cylinder 30 causes ram 40 to be forced downward, exerting a force on clevis 44. Toggle linkage 60 actuated by the force on clevis 44 begins its motion from a first position as shown in FIGS. 2 and 3 and in which the force on clevis 44 begins its motion from a first position as shown in FIGS. 2 and 3 in which the force multiplication of the toggle linkage is minimum. Toggle linkage 60 is then urged by ram 40 to a second position (not shown) in which the longitudinal axis of links 50 and 42 are collinear and the force multiplication of the toggle linkage theoretically approaches infinity.

The force input from links 50 and 52 cause jaws 70 and 72 to rotate in the directions indicated by the arrows "R" in FIG. 6. This in turn causes surface 90 of blade 82 to pass between surfaces 90', 90" of blades 82', 82". The edges of blades 82, 82', and 82" are held substantially square and the clearance between blade 82 and blades 82' and 82" is held sufficiently narrow that blades 82' and 82" cooperate to act as a die against which blade 82 works to shear the lateral edges 156, 158 of a rectangular tab or louver 160 (FIG. 8) while leaving the orthogonal edges 162 and 164 of seam 7 intact. The action of blades 82, 82', 82" then cooperate to deform the tab 160 into a bow-shape supported at the orthogonal ends 162 and 164, which bridges the window 166 that is formed in flange 7 by the shearing of tab 160. The action of blades 82' and 82" supporting seam 7 also deforms seam 7 slightly to form bulges 163, 165 extending in a direction opposite the deformation of tab 160.

Figure 8:
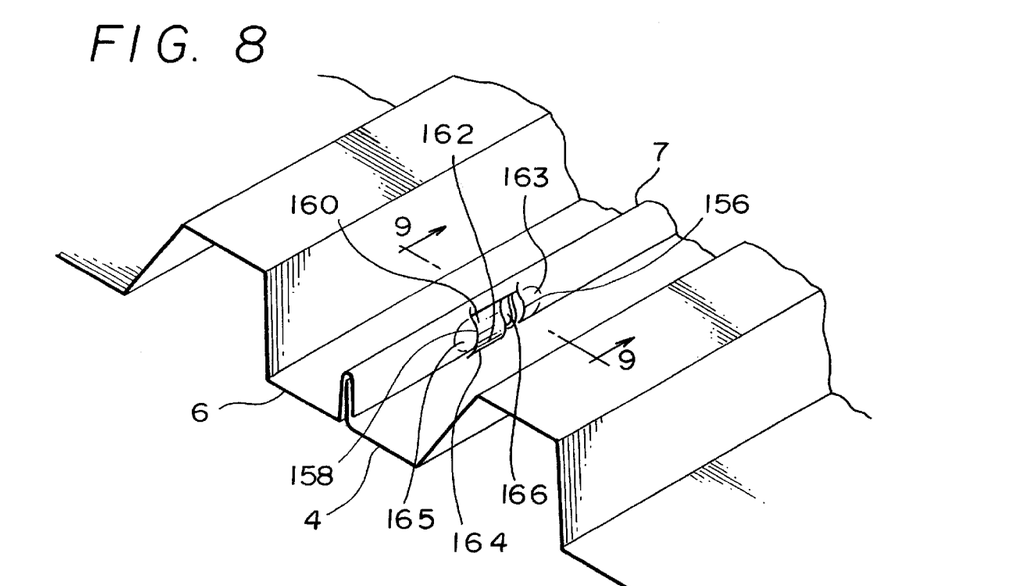
FIG. 8 is a perspective view of a portion of decking having formed therein a structural louver in accordance with the present invention.
Figure 9:
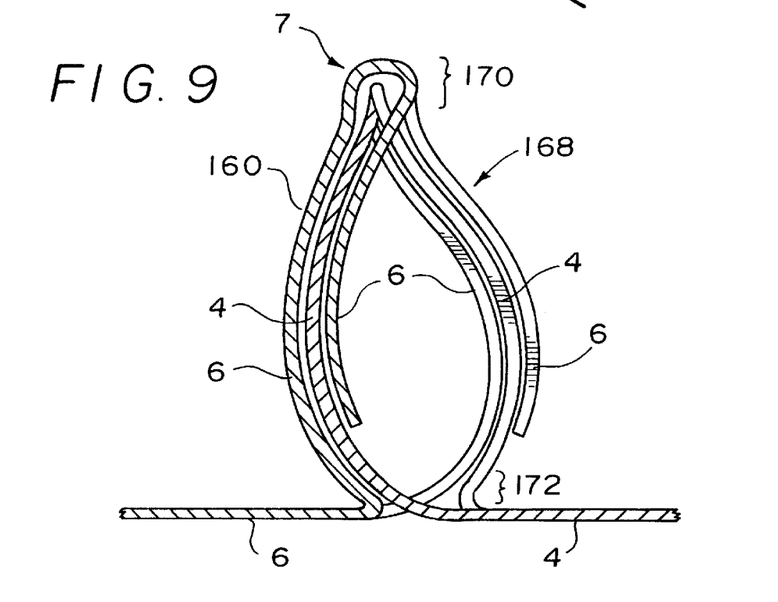
FIG. 9 is a cross-sectional view of the decking of FIG. 8 taken along line 9—9.

As shown in FIG. 8, the displaced tab 160 comprising crimped portions of lip 4 and "U" shaped lip 6 is displaced in a direction opposite the reveal portion 168 of window 166. If seam 7 is subjected to a shear loading in the "y" direction shown in FIG. 1, the displaced tab 160 will bear against the reveal portion 168 of window 166 in the regions indicated at 170 and 172. The bearing in these regions 170 and 172 is substantially normal to the contacting surfaces, therefore, no mechanical advantage is generated that would tend to pry on tab 160 or otherwise restore displaced tab 160 to its original configuration. Accordingly, in order for the seam to shift laterally, tab 160 would need to be sheared in the "y" direction by reveal 186 of window 166. Accordingly, the shear strength of a seam 7 sheared and upset using tool 10 has a lateral stiffness that approaches the shear strength of the decking material itself. By providing a mechanical feature in seam 7 that produces such extremely high shear strength, the need to screw the seam 7 together (a laborious task with substantial additional material costs) or weld the seam 7 (which releases toxic fumes when used on galvanized decking) is obviated.

The force multiplication of a toggle linkage such as is used in the present invention is highly sensitive to the beginning and ending gap of the jaws 70 and 72. As pivots wear through use, the toggle linkage may begin to go over center before the louvering operation is complete or, particularly where lighter gauge metal is used, the louvering may be complete before the linkage approaches its maximum force multiplication, thereby reducing the efficiency of the stroke. Accordingly, means are provided to permit both the input stroke to clevis 44 to be adjusted as well as the linkage ratio of the toggle linkage itself. The input stroke is adjustable by means of a threaded engagement 140 between ram 40 and clevis 44. Similarly, the linkage ratio of the toggle linkage 60 is adjustable by means of a threaded engagement 144 between an upper half 144 and a lower half 146 of link 52. Manipulation of the aforementioned adjustments permits the input stroke to be regulated to prevent the toggle linkage 60 from gong over center, which could lead to the mechanism becoming jammed, and permits the linkage ratio of the toggle linkage 60 to be adjusted to provide a predetermined displacement of tab 160 when the toggle linkage 60 is in the on-center position with the axis of links 50 and 52 collinear. The predetermined gap can be adjusted to accommodate the specified shear strength necessary to support a wide range of standard structural steel decking and roofing panels.

Although certain preferred embodiments and methods have been disclosed herein, it will be apparent from the foregoing disclosure to those skilled in the art that variations and modifications of such embodiments and methods may be made without departing from the spirit and scope of the invention. For example, in the illustrative embodiment the "die" formed by jaw assembly 72 is made from two identical jaws 72A and 72B that are identical mirror images of jaw 70, however, jaw assembly 72 could be made as a one-piece die without departing from the scope of the invention. Accordingly, it is intended that the invention shall be limited only to the extent required by the appended claims and the rules and principles of applicable law.

What is claimed is:

1. A portable aparatus for forming louvers in a seam of a section of structural steel decking comprising:

a frame;

a first and second pivoted jaw member each pivotally attached to said frame, each of said first and second pivoted jaw members comprising a free end and a driven end, said free end of said first jaw member having a blade portion, said free end of said second jaw member having a die portion, said free ends of said first and second jaw members being moveable between an open position in which said blade portion of said first jaw member is displaced from said die portion of said second jaw member to form a gap therebetween capable of recieving a seam formed in the steel decking, and a closed position in which said blade portion of said first jaw member passes at least partly through said die portion of said second jaw member, said blade portion and said die portion having surfaces cooperating to shear a portion of the seam as said blade portion passes through said die portion;

a pneumatic cylinder moveable between a first and a second position; and a linkage connected at one end to said pneumatic cylinder and at the other end to said first and second jaw members, said linkage moving said jaws to the open position in response to said pneumatic cylinder moving to the first position and moving said jaws to the closed position in response to said pneumatic cylinder moving to the second position; and an air valve for admitting a flow of pressurized air into said pneumatic cylinder to urge said pneumatic cylinder from said first position to said second position.

2. The apparatus of claim 1, wherein:

said blade portion of said first jaw member comprises a tip portion and a root portion, said tip portion comprising a rounded region and said root portion comprising an undercut region, said rounded region and said undercut region cooperating with said die portion of said second jaw member to shear two opposing sides of a rectangular louver out of the seam of the structural steel decking while leaving the remaining two opposing sides of the rectangular louver attached.

3. The apparatus of claim 1, wherein said second jaw member comprises a pair of jaws, each of said pair of jaws having a substantially identical planar cross section.

4. The apparatus of claim 3, wherein each of said pair of jaws has a planar cross section that is a mirror image of the planar cross section of said first jaw member.

5. The apparatus of claim 1, wherein said linkage comprises:

a first and second link, said first and second links each having first ends, said first ends being pivotally attached one to another to form a toggle input joint, said toggle input joint attached to said pneumatic cylinder, said first link pivotally attached at a second end thereof to said driven end of said first jaw member and said second link pivotally attached at a second end thereof to said driven end of said second jaw member.

6. The apparatus of claim 5, further comprising;

a cross head operatively attached to said toggle input joint to constrain said toggle input joint to move linearly, thereby causing said jaws members to move in unison.

7. The aparatus of claim 6, further comprising:

a connecting rod having an adjustable length operatively disposed between said pneumatic cylinder and said toggle input joint.

8. The apparatus of claim 1, wherein:

said pneumatic cylinder comprises a housing comprising a wall having a substantially circular interior cross section;

a flexible diaphragm disposed within said housing and sealed along an outer edge thereof to said wall to divide said housing into a first and second chamber, said first chamber having a fitting adapted to receive a source of high pressure air, said second chamber having an opening for venting said second chamber to the atmosphere, said diaphragm being adapted to be operatively attached to a connecting rod passing through said second chamber;

a spring disposed in said second chamber for urging said diaphragm toward said first chamber.

9. The apparatus of claim 1, further including an exhaust valve operatively disposed between said air valve and said pneumatic cylinder, said exhaust valve comprising:

a housing having an interior chamber, an inlet, an outlet, and an exhaust port, said exhaust port including a valve seat;

valve member comprising a flexible disk disposed in said chamber moveable between a first position in which said inlet is open and said exhaust port is sealed and a second position in which said exhaust port is open and said inlet is sealed, said valve member adapted to move to said first position in response to a flow of air through said inlet into said chamber and to move to said second position in response to a flow of air through said outlet into said chamber.

* * * * *

/

(12) EX PARTE REEXAMINATION CERTIFICATE (9685th)
United States Patent
Parker (10) Number: US 6,212,932 C1
(45) Certificate Issued: May 31, 2013

(54) PNEUMATIC SHEAR FOR FORMING STRUCTURAL LOUVERS

(75) Inventor: James R. Parker, Phoenix, AZ (US)

(73) Assignee: Verco Decking, Inc., Phoenix, AZ (US)

Reexamination Request:
No. 90/012,296, May 14, 2012

Reexamination Certificate for:
Patent No.: 6,212,932
Issued: Apr. 10, 2001
Appl. No.: 09/356,540
Filed: Jul. 19, 1999

(51) Int. Cl.
*B21D 39/03* (2006.01)
*B23D 29/00* (2006.01)
*B21D 7/00* (2006.01)

(52) U.S. Cl.
USPC .......... 72/409.12; 72/325; 72/451; 72/453.15

(58) Field of Classification Search
None
See application file for complete search history.

(56) References Cited

To view the complete listing of prior art documents cited during the proceeding for Reexamination Control Number 90/012,296, please refer to the USPTO's public Patent Application Information Retrieval (PAIR) system under the Display References tab.

*Primary Examiner* — Patricia Engle (57) ABSTRACT

A power assisted combination shear used for forming structural louvers in the crimped seam of structural steel decking comprises a frame supporting a pair of jaws which are opened and closed by means of an operator-controlled pneumatic cylinder. One jaw terminates in a blade, the other jaw has a corresponding die member. The blade and die have undercut reliefs in the root portions, which permit the louver to be formed without breaking through to the edge of the seam. The louver comprises a sheared portion in the form of a bowed tab bridging a corresponding window formed in the seam by the shearing of the tab. The interference between the louver and window provides a substantial increase in the lateral resistance (shear strength) of the crimped seam, thereby obviating the need to additionally weld or screw the seam to provide the necessary shear strength for even the highest stress applications.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-9, dependent on an amended claim, are determined to be patentable.

1. A portable apparatus for forming louvers in a seam of a section of structural steel decking comprising:
   a frame;
   a first and second pivoted jaw member each pivotally attached to said frame, each of said first and second pivoted jaw members comprising a free end and a driven end, said free end of said first jaw member having a blade portion, said free end of said second jaw member having a die portion, said free ends of said first and second jaw members being moveable between an open position in which said blade portion of said first jaw member is displaced from said die portion of said second jaw member to form a gap therebetween capable of receiving a seam formed in the steel decking, *wherein the seam comprises a female lip portion of a first piece of structural steel decking placed over a male lip portion of a second piece of structural steel decking,* and a closed position in which said blade portion of said first jaw member passes at least partly through said die portion of said second jaw member, said blade portion and said die portion having surfaces cooperating to shear a portion of the seam as said blade portion passes through said die portion *to thereby form a louver in the seam*;
   a pneumatic cylinder moveable between a first and a second position; and
   a linkage connected at one end to said pneumatic cylinder and at the other end to said first and second jaw members, said linkage moving said jaws to the open position in response to said pneumatic cylinder moving to the first position and moving said jaws to the closed position in response to said pneumatic cylinder moving to the second position; and
   an air valve for admitting a flow of pressurized air into said pneumatic cylinder to urge said pneumatic cylinder from said first position to said second position.

\* \* \* \* \*